April 19, 1927.
H. D. STEVENS
1,625,403
FLAP CUTTING AND MEASURING MACHINE
Filed Oct. 6, 1922    7 Sheets-Sheet 6
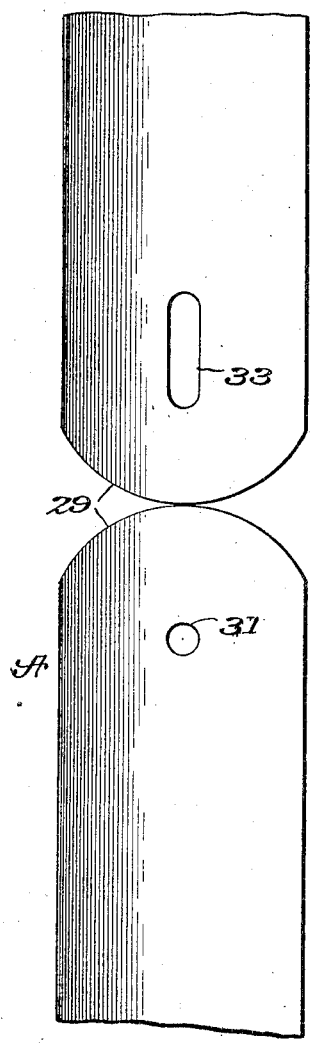
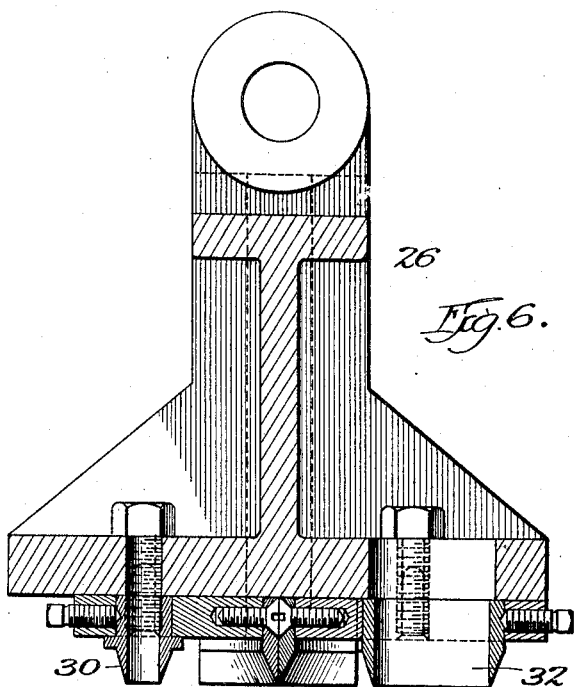
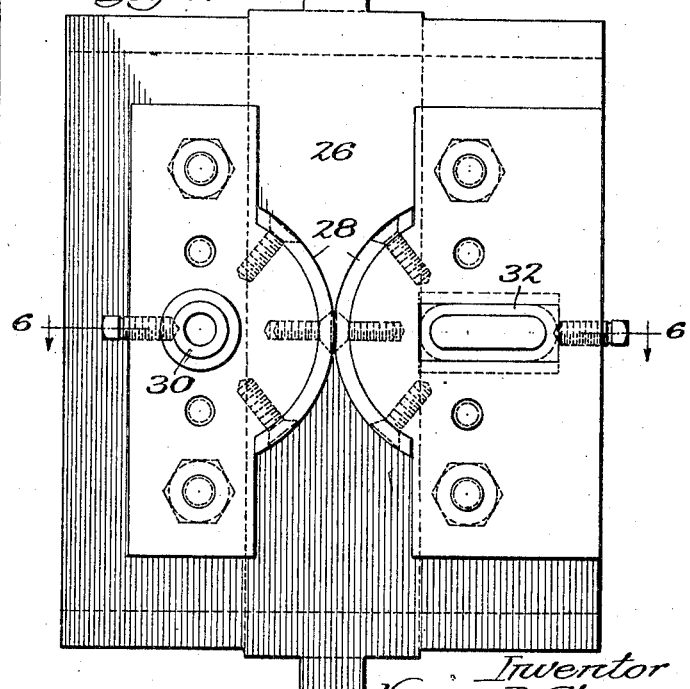

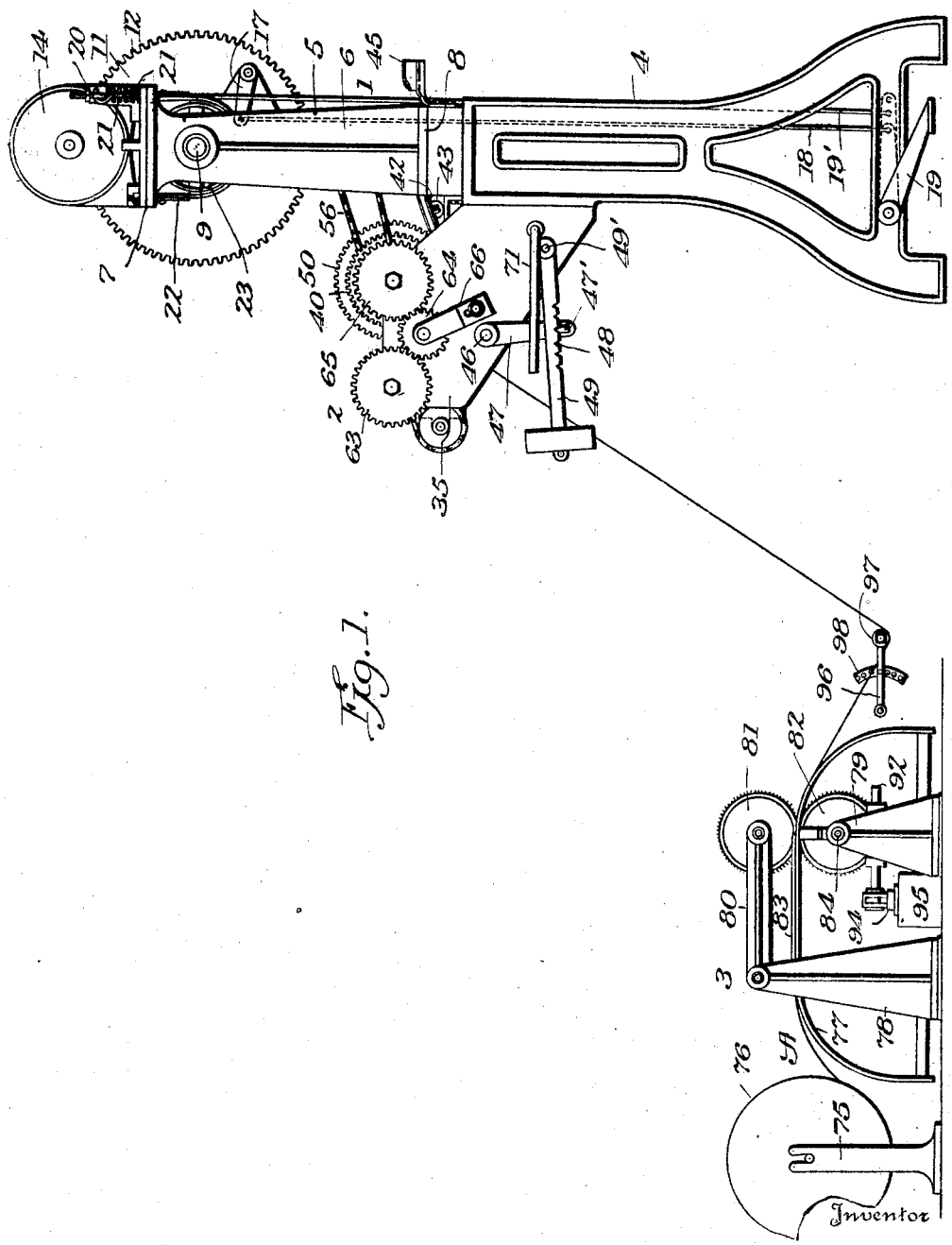

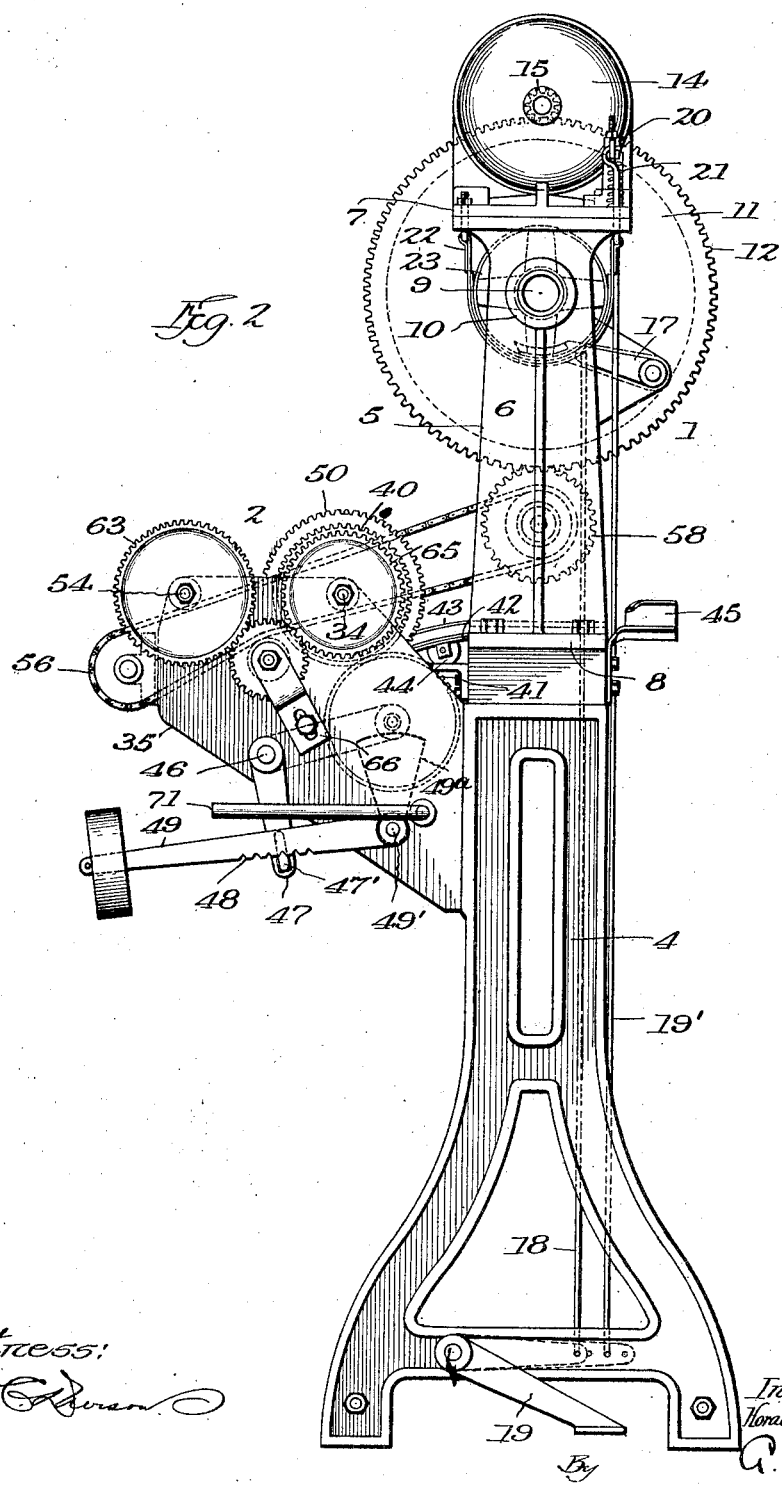

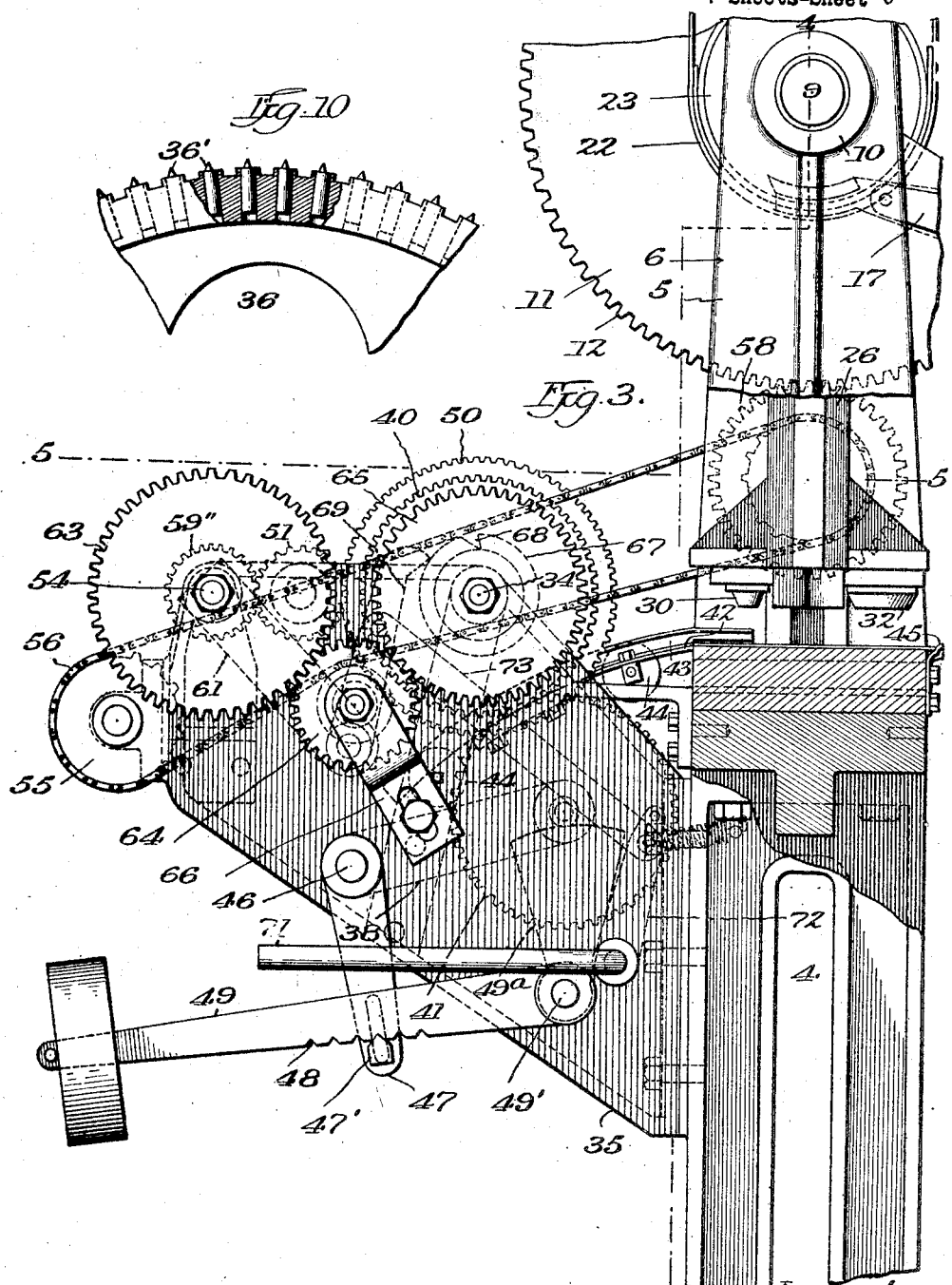

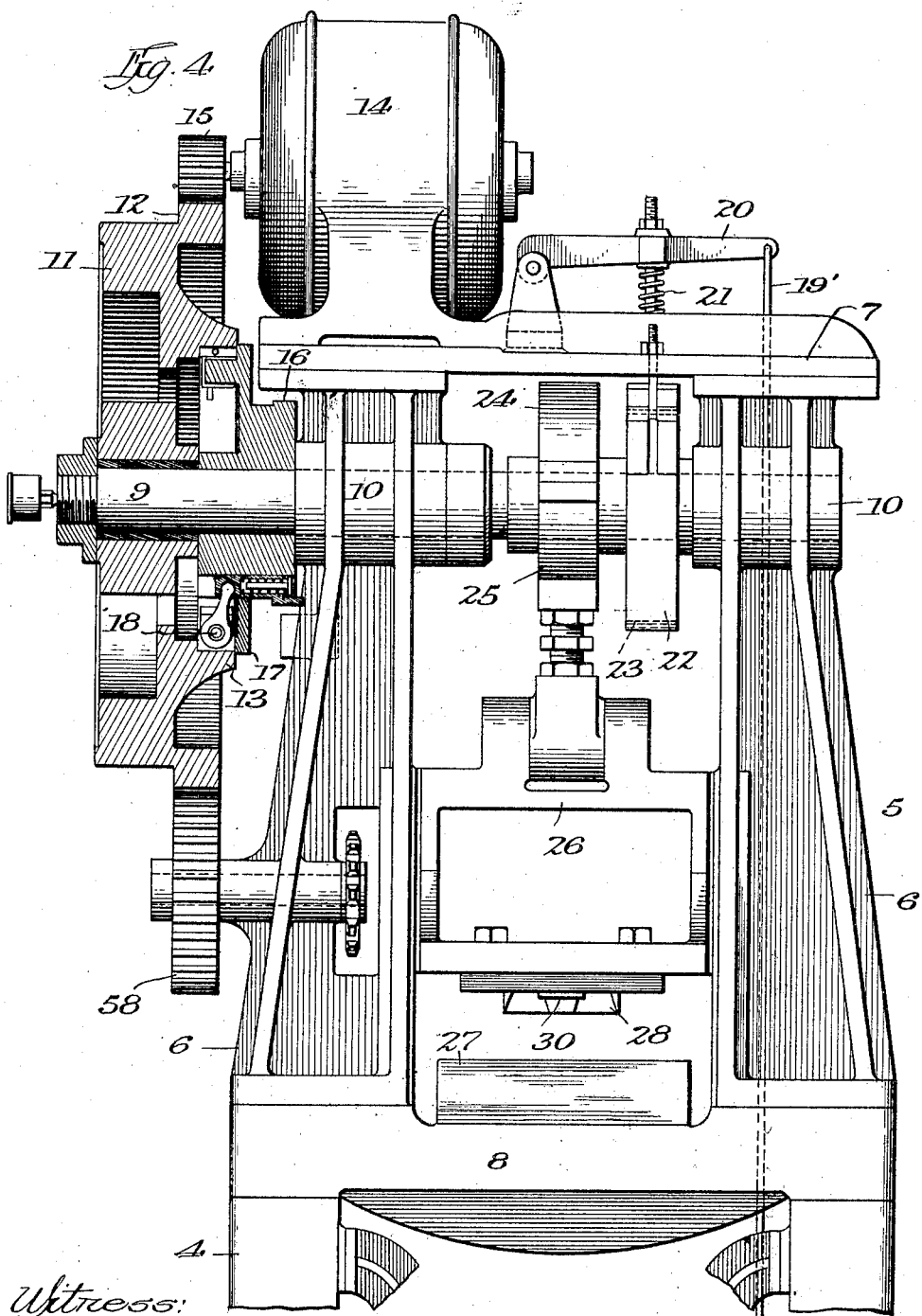

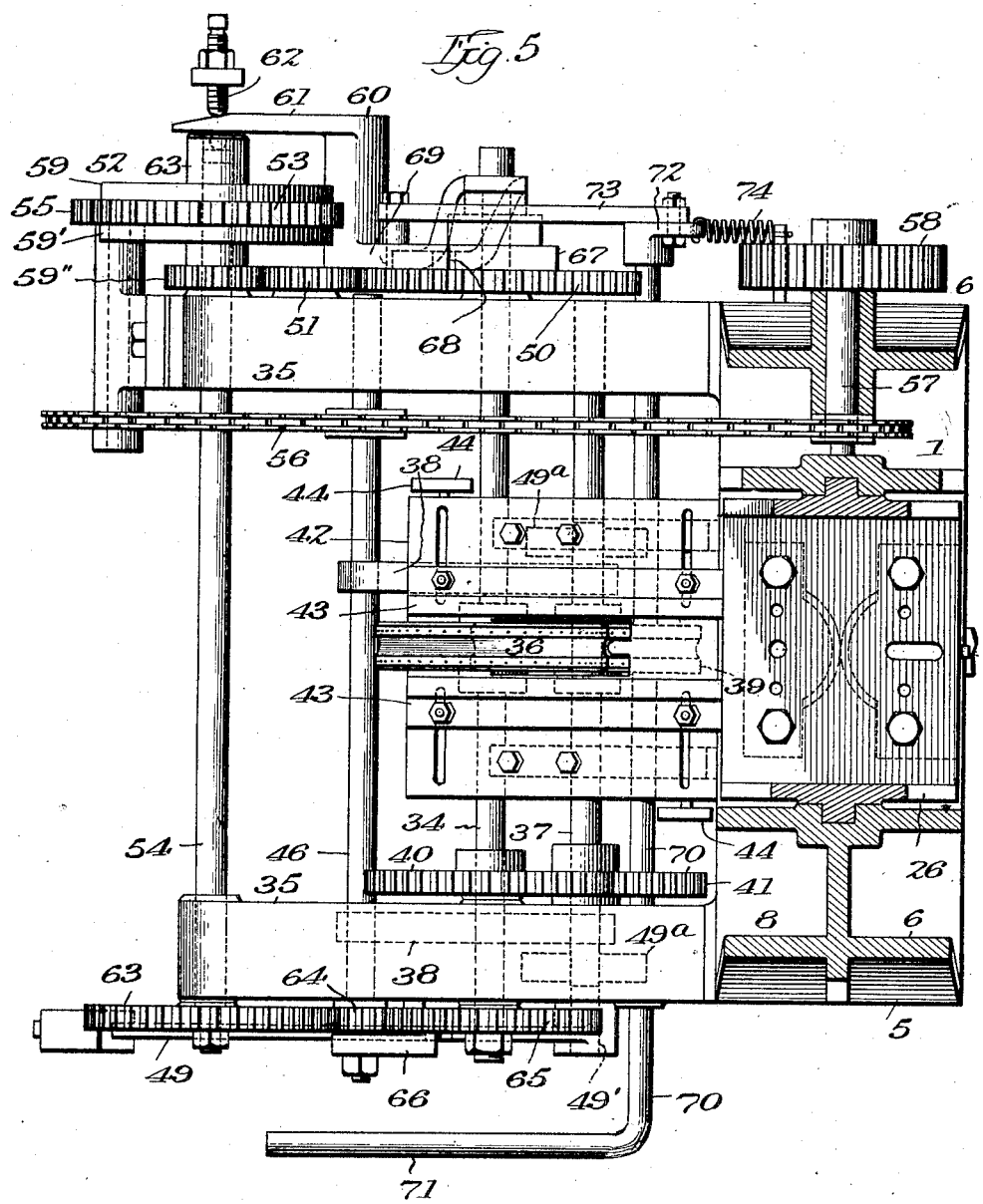

Patented Apr. 19, 1927.

1,625,403

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

FLAP CUTTING AND MEASURING MACHINE.

Application filed October 6, 1922. Serial No. 592,777.

My invention relates to machines for cutting and measuring flaps of the character used in conjunction with pneumatic tire casings.

Tire flaps, of the type which my machine is particularly designed to produce, comprise a length of rubber impregnated fabric having rounded ends which are designed to overlap when the flap is positioned within the tire casing. One end of the flap is provided with a circular aperture to receive the valve stem of the inner tube and the other end thereof is slotted longitudinally to also receive the valve stem of the tube and to allow for a certain degree of play of one end upon the other. These flaps are preferably constructed with a permanent curvature, both longitudinal and transverse, so that they readily conform to the shape of the inner tube of a tire. One method of producing flaps having these curvatures is to cut them from a continuous strip that has been vulcanized, in a convolute coil, upon a drum having a concave periphery, whereby the strip is cupped transversely and at the same time the convolutions thereof are given a permanent circular contour. Heretofore, so far as I am aware, these strips have been measured and cut into flap lengths by hand, but because of their permanent curvature, it is practically impossible to straighten out such strips in order to accurately measure and cut them. In fact, tire manufacturers have, in some instances, been obliged to discontinue vulcanizing flap material into the form described and to vulcanize it in the form of a flat strip so that it could be handled. The disadvantages arising from this contingency will be readily appreciated when it is understood that the method of forming flap material by vulcanizing it into its ultimate curvature upon a drum is recognized as more economical, quicker, requires fewer operatives, and produces the ideal flap.

With the foregoing in mind, my invention is designed with the partcular purpose in view of providing a practical machine for expeditiously cutting a preformed strip of the character above set forth into flap lengths and forming the apertures in the ends thereof.

It is also the purpose of my invention to provide a machine for performing the above function and at the same time measuring the strip into uniform lengths.

Other objects of my invention are to provide a machine which will feed the strip from the drum upon which it has been vulcanized, to cutting and measuring devices without tensioning the strip, and which will automatically maintain a uniform degree of slack in the strip whereby no stretching action occurs therein during the cutting and measuring operation.

Still another object of my invention is to provide measuring devices which are adapted to maintain the same degree of transverse curvature of the strip while it is being measured and to feed equal lengths of material which may differ in degrees of vulcanization.

A further object of my invention is to provide a machine adapted to simultaneously cut the strip so as to round off the ends of two flap lengths and provide the desired form of apertures therein.

Still another object of my invention is to provide, in a machine of the character, a feeding mechanism, the speed of which is controlled by the travel of the strip and the degree of slack in said strip.

Other objects and advantages will presently appear as this description proceeds and is read in conjunction with the drawings accompanying and forming a part of this specification.

In said drawings:

Figure 1 is a side elevational view illustrating one form of machine constructed in accordance with my invention;

Figure 2 is a side elevational view, on an enlarged scale, illustrating the cutting and measuring mechanism of the machine;

Figure 3 is a side elevational view, partly in section, illustrating, on an enlarged scale, a portion of the machine shown in Figure 2;

Figure 4 is a vertical sectional view on the irregular line 4—4 of Figure 3, parts being shown in elevation;

Figure 5 is a transverse sectional view taken on the line 5—5 of Figure 3;

Figure 6 is a vertical sectional view on the line 6—6 of Figure 7, showing a die head forming a part of my invention and illustrating the parts thereof on a further enlarged scale;

Figure 7 is a bottom plan view of the die head;

Figure 10 is a detail side elevation, partly in section, of one of the elements for measuring the strip; and Figure 11 is a plan view illustrating the manner in which the strip is severed and apertured.

Figure 8:
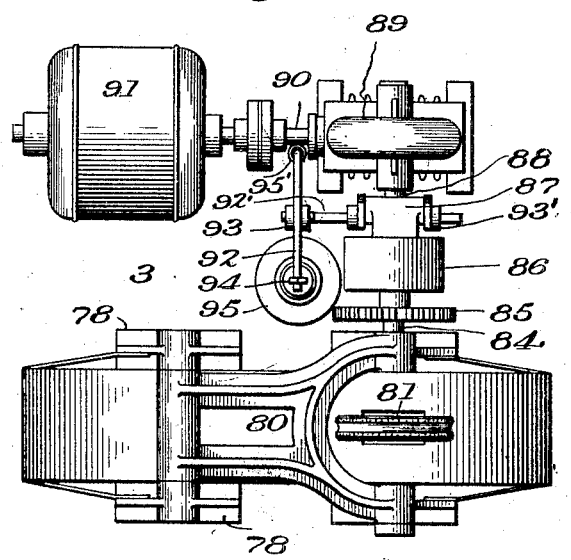
Figure 8 is a plan view of a feeding mechanism forming a part of my machine.
Figure 9:
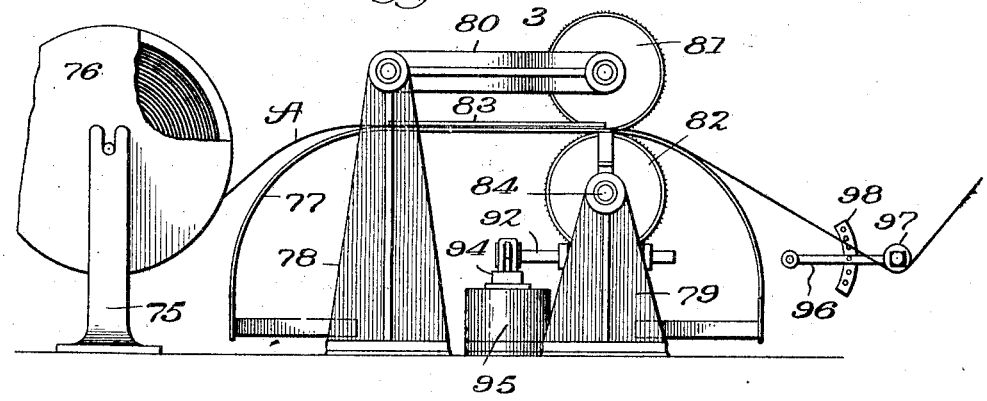
Figure 9 is a side elevational view of the feeding mechanism.

In the drawings, 1 designates, as a whole, the cutting mechanism of my invention, 2 the measuring mechanism, and 3 the feeding mechanism.

The cutting mechanism 1, to which the strip is fed in a manner presently set forth, will first be described in detail. It comprises a pair of vertical standards 4 arranged in spaced relation and carrying upon their upper ends a frame 5 that is formed of spaced uprights 6 and transverse top and bottom bars designated respectively 7 and 8. A transversely disposed main drive shaft 9 is journaled in suitable bearings 10 in the upper end of the uprights 6. One end of the shaft 9 projects beyond one of the uprights 6 and carries a freely rotatable drive wheel 11. The periphery of the wheel 10 is provided with a gear portion 12 and its inner face is formed to provide a clutch flange 13. The wheel 11 is driven by a motor 14 having a driving pinion 15 that meshes with the gear portion 12. The motor is preferably secured upon the cross bar 7 of the frame 5, as shown in Figure 4, and serves to continuously drive the wheel 11. The clutch flange 13 of the wheel 11 is engaged by a one revolution clutch element 16 that is fixed upon the shaft 9 whereby a single revolution of the shaft 9 may be effected by the operator when desired. Any suitable form of clutch element may be utilized, this feature forming, per se, no part of the present invention. In the present instance, I have illustrated, generally a form of clutch element 16 which is adapted to be held in disengaging position relative to the collar 13 by one end of a lever 17 that is pivoted at its other end to the frame 5 and is movable into and from engagement with said element. The clutch element 16 and the lever 17 are so constructed and arranged that when the lever is moved from engagement with the element 16, the element will clutch the wheel 11 and rotate the shaft 9 and when it engages the element, said element is held in disengaged position. The lever 17 is moved from engagement with the element 13 by a pull rod 18 and a treadle 19 that is arranged to be depressed by the operator. A second pull rod 19' is operated by the treadle 19 simultaneously with the rod 18 to depress a rocker arm 20 that is mounted upon the bar 8 of the frame 5. Rocker arm 20 is depressed against a spring 21, to release a brake band 22 from a drum 23 upon the shaft 9. The treadle 19 is designed to be immediately released by the operator, whereupon the spring 21 returns the rocker arm 20 and pull rods 18 and 19' to their original positions, engages the band 22 with the drum 23 to brake the shaft and also moves the lever 17 to disengage the element 16 from the clutch collar 13.

Intermediate the uprights 6 of the frame 5, the shaft 9 carries an eccentric 24. A strap 25 surrounds the eccentric 24 and is connected to a cross head 26. The cross head 26 is guided between the uprights 6 of the frame 5 to reciprocate vertically over a platen 27 of any suitable construction.

The strip of flap material A is fed beneath the cross head 26 and over the platen 27 in a manner presently apparent.

Upon the lower face of the cross head 26 a plurality of removable dies are arranged as follows: Centrally of the cross head there are two substantially semi-circular dies 28 that are reversely arranged to sever the strip and round off the severed ends thereof in reverse directions, as at 29, see Figure 11. A circular die 30 is arranged to one side of the dies 28, in position relative thereto to cut a circular aperture 31 in one end of the severed strip. A third die 32 is disposed upon the opposite side of the dies 28 in position to cut an elongated aperture or slot 33 in the opposite end of the strip. A single revolution of the shaft 9, effected in the manner previously described, impresses the die upon the strip A and withdraws it to idle position. The arrangement of dies described, it will be noted, severs the strip to cut and aperture one end of two flaps and as the feed of the strip progresses the opposite end of one flap is cut while the forward end of another flap is being similarly treated.

The measuring devices are constructed and arranged as follows:

A rotary shaft 34 is journaled at its ends transversely of the standards 4 and in brackets 35 that project rearwardly from the standards. Intermediate its ends and centrally of the cross head 26 and the platen 27, the shaft 34 is provided with a strip engaging wheel 36 that is fixed thereon. Beneath the shaft 34 and somewhat in front thereof, a second rotary shaft 37 is journaled at its ends in a pair of vertically movable arms 38. The shaft 37 carries a second strip engaging wheel 39 fixed thereon in the plane of the wheel 36. Wheels 36 and 39 have concave peripheries and their edges are provided with radial teeth 36' of the character shown in Figure 10. These wheels are designed to grip the strip A between their peripheries to move it beneath the cross head and they are therefore geared together for positive rotation in opposite directions by gear wheels 40 and 41 affixed respectively upon the shafts 34 and 37. A slotted table 42 of curvilinear form is disposed adjacent the wheels 36 and 39 and provided with guides 43 that are adjustable laterally of each other by means of set screws 44 to center the strip A relative to said wheels.

The table is constructed on the radius of a circle corresponding substantially to the curve of the convolutions of the strip A so that the strip may be fed thereover without straightening it out longitudinally. In other words, the strip is guided in its passage through the wheels 36 and 39 in an arcuate path corresponding to its permanent longitudinal curvature. If desired, another guide 45, preferably V-shaped in cross-section, may be utilized in front of the platen 27 to hold the free end of the strip A in proper alignment relative to the cross-head 26.

The wheels 36 and 39 are driven to rotate them a certain cycle of movement, whereupon their rotation is automatically stopped and the cross-head may be rendered active to sever the strip. This action of the wheels 36 and 39 feeds uniform flap lengths beneath the cross head 26 and the driving mechanism for the wheels is constructed so that different flap lengths may be fed and cut, all of which will presently appear.

At this point, however, attention is directed to a peculiar function of the wheels 36 and 39. Flap material that is vulcanized upon a concave drum presents different cross-sectional curvatures. The innermost convolutions usually cure in conformity with the transverse curvature of the drum but the successive convolutions tend to flatten out transversely on a longer radius. Furthermore, the convolutions are cured to different degrees of hardness, the inner and outermost convolutions being cured harder than the intermediate convolutions. In order to accurately measure uniform lengths from a reel of flap material under these conditions, I provide the concave toothed wheels and mount one wheel, preferably the under one, for adjustment toward and away from the other. Such an arrangement is shown in the drawings, wherein wheel 39 and the arms 38 are mounted to swing upon a rod 46 that extends parallel with the shafts 34 and 37. The rod 46 carries a depending arm 47 that is loose thereon and is provided with a toothed projection 47' at its free end that engages a rack 48 on the under side of a weighted lever 49. The lever 49 has one of its ends fixed upon a rock shaft 49' that is journaled in the brackets 35 beneath the shaft 37. A pair of cam sectors 49ª are affixed upon the shaft 49' in position to engage opposite ends of the shaft 37. By moving the lever 49 to disengage the tooth 47' from the rack 48 of said lever, the shaft 49' and cam sectors 49ª may be rocked to raise or lower the shaft 37 and move the wheel 39 relative to the periphery of wheel 36. Through this adjustment the teeth 36' of the wheels 36 and 39 may always be caused to penetrate the strip A to the same depth regardless of its degree of hardness and thus the same effective periphery of the feeding wheels is maintained. Wheels 36 and 39 also tend to compress and flatten the strip out transversely to such a degree that it always presents substantially the same transverse curvature during its passage between said wheels. Inasmuch as it is not feasible to straighten such a strip longitudinally and it must therefore be measured in its curved form, the tooth rollers must always grip the strip at the same distance from its center line; otherwise, because of the variations in transverse curvature of the strip, unequal lengths will be pulled through the wheels 36 and 39. I avoid this contingency as it is believed will be apparent without further explanation by comprising the strip to flatten it in the manner above described. Some of the convolutions of the strip cure with a longitudinal central rib. To accommodate this formation the wheels 36 and 39 are concaved as shown.

The means for driving the wheels 36 and 39, and forming therewith the measuring component of the machine will now be described. Upon one end of the shaft 34 a gear wheel 50 is mounted to rotate freely thereon and to mesh with a smaller idler gear 51 that is suitably journaled upon one of the brackets 35. The idler gear 51 is driven by a clutch device 52, the driving element of which comprises a gear wheel 53 that is freely rotatable upon one end of a rotary shaft 54 and slidable longitudinally thereof. Shaft 54 is journaled in the brackets 35 in the rear of shaft 34 and parallel therewith. Gear wheel 53 is constantly rotated by a driving pinion 55 that meshes therewith and is driven in turn by a sprocket and chain connection 56 that extends to a stud shaft 57. The stud shaft 57 is journaled for rotation adjacent the wheel 11 and carries a gear wheel 58 fast thereon and in mesh with the teeth 12 of the wheel 11. A pair of opposed clutch discs 59 and 59' are carried upon one end of the shaft 54 in position to clamp the wheel 53 therebetween. Each disc is keyed to the shaft 54, the former being slidable longitudinally thereon, whereas the latter disc is stationary relative to said shaft. The stationary disc carries a gear pinion 59'' that meshes with the idler 51. The slidable disc is adapted to be moved against the wheel 53 to clamp it against the stationary disc by means of a rocking V-shaped lever 60 pivoted at its apex to one of the brackets 35. One arm 61 of the lever 60 is wedge shaped and is adapted to rock across the axis of the shaft 54 between an adjustable abutment 62 and the hub 63 of the slidable disc 59 to force the latter element against the wheel 53 and the stationary disc 59'. By this means motion is imparted to the shaft 54 and the stationary disc 59'. The shaft 59 in turn rotates a gear wheel 63 fast on the other end thereof which meshes with an idler gear 64 that is also in mesh with a gear 65 fixed upon the adjacent end of the shaft 34, whereby the latter shaft is driven to rotate the wheel 36 and, through the medium of the gears 40 and 41, the wheel 39. The idler 64 is journaled in an adjustable bracket 66 whereby other gears may be substituted in place of the gears 63 and 65 and the ratio of speed of the wheels 36 and 39 changed relative to the speed of rotation of the shaft 54. Thus longer or shorter flaps may be measured and cut by the simple expedient of substituting different gears for the gears 63 and 65. The stationary disc 59' drives the idler 51 and the gear 50 upon the shaft 34. Gear 50 carries a disc 67 having a notch 68 in its periphery. The other arm 69 of the lever 60 is adapted to drop into this notch 68 whereupon the lever is rocked to move its arm 61 from between the abutment 62 and hub 63 of the disc 69, and the wheel 53 will be thereby released and rotation of the shaft 54 stopped upon one revolution of the wheel 50. A transverse control shaft 70 is journaled in the brackets to be rocked by a hand lever 71 at one end thereof. The opposite end of the shaft carries an upstanding finger 72. A link 73 connects the finger 72 with the arm 69 of the rocking lever 60 so that when the shaft 70 is rocked in one direction the arm 69 is released from the notch 68 and the arm 61 is moved to render the clutch element 52 active. A retractile spring 74 serves to normally pull the shaft 70 in the opposite direction to engage the arm 69 with the notch 68.

The feeding mechanism 3 of my invention is arranged in the rear of the measuring and the cutting mechanism to feed the strip from a drum upon which it has been cured. It embodies a support 75 adapted to support a curing drum 76 for free rotation thereon in substantially the plane of rotation of the wheels 36 and 39. An upwardly bowed table 77 is arranged in front of the support 75 and in the plane of the drum 76. A pair of oppositely disposed uprights 78 support the table 77 at the rear end thereof and a pair of similar but shorter uprights 79 support the front end of the table. Between the uprights 78 the rear end of an arm 80 is pivoted so that said arm may swing vertically above the table 77. At its forward or free end, the arm is provided with a toothed wheel 81, similar to wheels 36 and 39, that is adapted to rotate in the plane of the drum 76. A second wheel 82 of the same construction is mounted beneath the wheel 81 to rotate in the same plane. Wheels 81 and 82 are adapted to pull the strip A from the drum 76 over the table 77 and beneath a centering guide 83. The wheel 82 is fixed upon a cross shaft 84 that extends transversely of the table and is journaled at one end in the uprights 79. Wheels 81 and 82 are geared together for positive rotation in opposite directions, one of the gears being shown at 85. Upon the end of the shaft 84 opposite the journaled end thereof, one member 86 of a clutch device is mounted. A complemental clutch element 87 is slidably mounted upon one end of the driving shaft 88 of a speed reduction device 89, the shaft of the device 89 being aligned with the shaft 84. The driven shaft 90 of the speed reduction device is coupled to the shaft of a suitable motor designated 91. Parallel with the shaft 88 of the speed reduction device a rocker arm 92 having a laterally projecting pivot post 92' is journaled in a support 93. The pivot post of the rocker arm 92 is fixed relative thereto and extends over the shaft 88 and carries a forked arm 93' that engages the clutch element 87 to slide it on the shaft 88 into and out of engagement relative to the clutch element 86.

The core 94 of a solenoid coil 95 normally holds one end of the arm 92 in a depressed position and in this position of the arm the forked arm 93 is arranged to engage the clutch member 87 with the member 86. When the coil 95 is de-energized in a manner presently explained, a coil spring 95' at the opposite end of the rocker arm 92 rocks it upon its standard 93 whereby the arm 93' is moved to disengage the clutch element 87 from the element 86.

A pivoted switch arm 96, having at its free end a horizontally disposed roller 97, is arranged in front of the table 77 to swing in a vertical plane and to engage a series of contacts 98. Contacts 98 and the switch 96 are arranged in any suitable manner, in a system of circuits including the motor 91 and a source of energy so that when the switch 96 is raised the speed of the motor is accelerated and when the switch is depressed its speed is retarded. The solenoid 95 is also arranged in circuit with the switch element 96 and the contacts 98 in such manner that when the switch drops below the contacts the solenoid is cut off and the clutch element 87 disengaged from the element 86 through the action of the coil spring 95'.

No system of circuits has been illustrated herein as the arrangement thereof may be varied and any suitable construction may be resorted to within the spirit of my invention.

The feed mechanism operates as follows: The end of the strip is pulled from the drum over the table and between the peripheries of the wheels 81 and 82 to the measuring rollers 36 and 39. The strip is arranged with sufficient slack therein between the feeding mechanism and the measuring devices so that no tension is exerted against the pull of the measuring devices. The bight of the slack is passed under the roller 97 of the switch 96 and the mechanism is started. As long as the slack is maintained the roller 97 and switch 96 remain stationary. Should the degree of slack in the strip vary in either direction, to a certain degree, the switch 96 is raised or lowered by the strip to engage different contacts in the series 88, whereby the speed of the motor is slowed or accelerated, the wheel 82 correspondingly affected and the feed of the strip varied to take up the slack in the strip or to increase it. Should the slack through any contingency suddenly become so great as to permit the roller 97 and the switch to fall below the contacts 98, the solenoid will become deenergized and the feed of the strip stopped until the slack has been taken up by the measuring devices 2 sufficiently to raise the roller 97 into engagement with one of the contacts 98.

Although I have described my invention in detail, together with its operation upon a certain form of flap material, it is to be understood that it may be utilized to cut other forms of flap material and in other capacities. Furthermore, it is susceptible of a wide range of modification as regards the construction and arrangement of its several parts, all within the spirit of the invention and the scope of the appended claims.

What I claim is:

1. Mechanism for forming tire flaps from strip material comprising, means for cutting the strip, means for measuring the strip before it is cut, and means for feeding the strip with a slack therein to the measuring means said feeding means being adapted to vary the speed at which the strip is fed in accordance with the degree of slack in said strip.

2. Mechanism for forming tire flaps from strip material comprising, means for severing the strip, means for measuring the strip, and means for feeding the strip to the measuring means comprising speed control devices adapted to vary the speed at which the strip is fed through engagement with said strip.

3. Mechanism for forming tire flaps from strip material comprising, means for cutting the strip, means for measuring the strip before it is cut, drive mechanism normally disconnected from both of said means, means for connecting either of said means with the drive mechanism to render them active, and devices for automatically disconnecting the measuring means from the driving means.

4. Mechanism for forming tire flaps from strip material comprising, driven means for severing the strip and simultaneously perforating the severed ends thereof, driven means for measuring the strip before it is severed, drive mechanism normally disconnected from both said means, means for connecting either of said devices with drive mechanism to render them active, and devices for automatically disconnecting the measuring means from said driving means.

5. Mechanism for forming tire flaps from strip material comprising, means for severing the strip, driven means for measuring the strip, drive mechanism normally disconnected from the measuring means, devices for connecting the measuring means with the drive mechanism, and devices for automatically disconnecting the measuring means from the drive mechanism.

6. Mechanism for forming tire flaps from strip material comprising, means operable to sever the strip, means operable to measure the strip, drive mechanism common to both said means normally disconnected therefrom, individual devices for each said means operable to connect them with the drive mechanism, and means for automatically disconnecting the measuring means from said drive mechanism after it has completed its cycle of operation.

7. Mechanism for forming tire flaps from strip material comprising, driven means for severing the strip, rotary means for measuring the strip, drive mechanism common to both said means normally disconnected from the measuring means, devices for connecting the measuring means with the drive mechanism, means for varying the ratio of speed of the measuring means relative to that of the driving mechanism, and automatically operating means for disconnecting the measuring means from the driving mechanism.

8. Mechanism for forming tire flaps from strip material comprising, reciprocable cutter devices for severing the strip, rotary measuring devices for determining the length of the strip to be severed, driving mechanism common to said devices, clutch mechanism operable to connect the cutter devices with said mechanism, clutch mechanism operable to connect the measuring devices with said mechanism, and means for varying the speed of the measuring devices relative to that of the driving mechanism.

9. Mechanism for forming tire flaps from strip material vulcanized in convolute form comprising, reciprocable cutter devices, rotary measuring devices adapted to feed the strip to the cutter devices, means adapted to guide the strip through the measuring devices in an arcuate path substantially of the form in which the strip is vulcanized, drive mechanism for the measuring devices, and means for varying the ratio of speed of the measuring devices relative to that of said drive mechanism.

10. Mechanism for forming tire flaps from strip material vulcanized in convolute form comprising, reciprocable cutter devices adapted to simultaneously sever the strip and perforate the ends thereof, measuring devices for feeding the strip to the cutter devices, means adapted to guide the strip in an arcuate path substantially of the form in which the strip is vulcanized through the measuring devices, and means for driving said devices.

11. Mechanism for forming tire flaps from strip material comprising, driven cutter devices adapted to simultaneously sever the strip and perforate the severed ends thereof, rotary measuring devices for feeding the strip to the cutter devices, means adapted to guide the strip in an arcuate path through the measuring devices, drive mechanism common to said devices, and means for varying the ratio of speed of one of the devices relative to that of said drive mechanism.

12. Mechanism for forming tire flaps from strip material comprising, reciprocable cutter devices, rotary measuring devices for feeding the strip to the first devices, means for guiding the strip in an arcuate path through the second devices, driving mechanism common to said devices, and means for varying the ratio of speed of one of said devices relative to that of the drive mechanism.

13. Mechanism for forming tire flaps from strip material comprising, reciprocable cutter devices, rotary measuring devices for feeding the strip to the first devices, means for guiding the strip in an arcuate path through the second devices, drive mechanism common to said devices and normally disconnected therefrom, individual means for connecting either of said devices with said drive mechanism, and means for automatically disconnecting one of the devices from said driving mechanism.

14. Mechanism for forming tire flaps from strip material comprising, reciprocable cutter devices, rotary measuring devices for feeding the strip to the first devices, means for guiding the strip in an arcuate path through the second devices, drive mechanism common to said devices normally disconnected therefrom, individual means for connecting either of said devices with said drive mechanism, individual means for automatically disconnecting either of said devices from said drive mechanism, and means for varying the ratio of speed of the measuring devices relative to that of the drive mechanism.

15. Mechanism for forming tire flaps from strip material comprising, driven cutter devices, rotary measuring devices adapted to grip and feed the strip to the first devices, means for guiding the strip in an arcuate path through the measuring devices, means for adjusting the measuring devices to compress the strip, and means for driving said devices.

16. Mechanism of the class described comprising, driven cutter devices, rotary measuring devices adapted to grip and feed the strip to said first devices, means for guiding the strip in an arcuate path through the measuring devices, means for adjusting the measuring devices to compress the strip, drive mechanism for said devices, and means for varying the ratio of speed of the measuring devices relative to that of the drive mechanism.

17. Mechanism of the character described comprising, driven cutter devices, rotary measuring devices adapted to grip and feed the strip to the first devices, means for guiding the strip in an arcuate path through the measuring devices, means for adjusting the measuring devices to compress the strip, drive mechanism for said devices, and automatically operating means for disconnecting the measuring devices from the drive mechanism.

18. In mechanism for forming tire flaps from strip material, in combination, a reciprocable cross head embodying reversely arranged semi-circular cutter dies, a perforating die disposed radially of each cutter die, rotary measuring devices for feeding the strip to said cross head, and driving means for said cross head and devices.

19. In mechanism for forming tire flaps from strip material, in combination, a driven cutter device, a measuring device comprising rotary toothed rollers having respectively concave peripheries, means for adjusting the rollers relative to each other, and means for driving said devices.

20. In mechanism for forming tire flaps from strip material, in combination, a reciprocable cutter device, a rotary shaft in advance of said device, a toothed roller upon said shaft, a second similar roller mounted beneath the first roller for adjustment with respect thereto, a second rotary shaft in advance of the first shaft, means for driving the second shaft, and interchangeable gears between said shafts for varying the ratio of speeds of one relative to the other.

21. In mechanism of the character described, a measuring device comprising, cooperating toothed rollers adapted to feed a strip of material therebetween, a curvilinear guide for feeding the strip between the rollers in an arcuate path, a rotary shaft, means for rotating the shaft, and interchangeable gears between the shaft and one of the rollers for varying the ratio of speed of said roller relative to said shaft.

22. In mechanism of the character described, a measuring device comprising toothed cooperating rollers having respectively concave peripheries said rollers being arranged to grip and feed a strip of material between their peripheries, a rotary shaft, means for driving the shaft, a clutch operable to engage the driving means with the shaft, interchangeable gears for revolving one of the rollers from the shaft, and devices for automatically disengaging the clutch from the shaft when said roller has completed a certain cycle of movement.

23. In a device of the character described, in combination, means for measuring a strip of material, means for feeding the strip to the measuring means comprising a rotary drum for containing a reel of the strip material, cooperating rollers for pulling the material from the drum, a drive mechanism for one of the rollers, and devices for controlling the speed of the drive mechanism in accordance with the degree of slack in said strip.

24. In a device of the character described, in combination, means for measuring a strip of material, and means for feeding the strip comprising a rotary drum for containing a reel of the strip material, cooperating rollers for pulling the material from the drum, driving mechanism for one of the rollers, and devices for controlling the speed of the driving mechanism in accordance with the degree of slack in the strip said devices including a solenoid and a switch operated through engagement with said strip.

25. In a machine for feeding a strip of fabric and rubber to measure definite lengths thereof, a feeding wheel, pressure devices acting on said wheel, pins on said feeding wheel adapted to prick into the mesh of the fabric, and means to adjust the pressure devices.

26. In a machine for feeding a strip of fabric and rubber to measure definite lengths thereof, a pair of feeding wheels between which the material is fed said feeding wheels being provided with teeth adapted to enter the mesh of the material, and means to force the wheels together with varying degrees of pressure depending on the character of the material.

27. In a machine for cutting foraminous stock of the character set forth in measured lengths, the combination of a pair of oppositely disposed feeding drums one of said drums being provided with projecting teeth adapted to enter the mesh of the material, and variable means to force the teeth into the material, in combination with devices for causing a predetermined number of revolutions of the feeding drums.

28. In a machine for cutting foraminous material of the character set forth in measured lengths, the combination of a pair of oppositely disposed feeding drums one of said drums being provided with projecting teeth adapted to enter the mesh of the material, means to press said drums together with varying degrees of pressure, rotating mechanism for said drums, and means to arrest the rotation of the drums at predetermined points, in combination with cutting devices for the fabric.

HORACE D. STEVENS.